United States Patent Office 2,796,357
Patented June 18, 1957

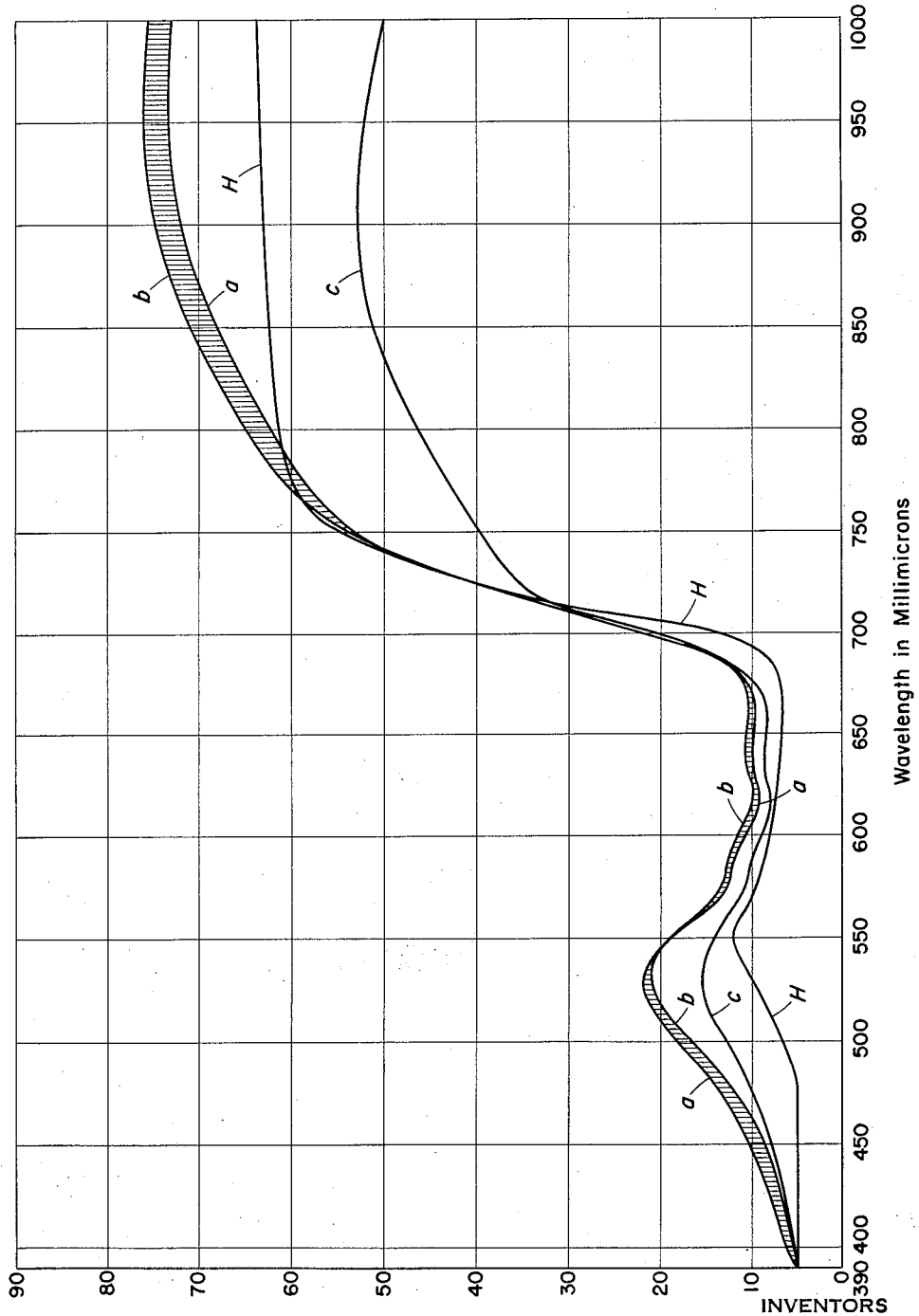

2,796,357

COLORED PIGMENT FOR CAMOUFLAGE COATING COMPOSITIONS

Warren M. Foss, Nixon, and Walter K. Nelson, Metuchen, N. J., assignors to National Lead Company, New York, N. Y., a corporation of New Jersey Application October 7, 1953, Serial No. 384,539

1 Claim. (Cl. 106—296)

The present invention relates in general to pigment materials and more particularly to a colored pigment for use in preparing camouflage coating compositions, such as paints, varnishes and the like, the present application being a continuation in part of the copending application of Foss et al., Serial No. 308,662, filed September 9, 1952, for an improved colored pigment and method for making same.

Earlier work in the field of camouflage paints has established what are now regarded as the primary requisites of a camouflage coating composition, namely that it have a visually dark green color akin to that of natural foliage and that it possess the high infrared reflectance value of natural foliage or more particularly chlorophyll which characterizes the infrared reflectance value of natural green foliage.

It has been noted that the spectrophotometric curve of chlorophyll has a characteristically sharp rise in reflectance value in the relatively short wave length range of from about 670 to 750 millimicrons and that inasmuch as camouflage paints heretofore used have not had this sharp rise in reflectance value within this critical wave length range, it has been relatively easy to detect camouflaged gun emplacements, ammunition supply dumps, power plants and the like by means of aerial photography and in particular infrared photography techniques.

The present invention relates to the discovery that the addition of the oxides of zinc to pigment compositions of the type described in the above-identified copending application, and hereinafter referred to as compounds of the chromium-cobaltous-titanium oxide system, has the effect of increasing the reflectance values of these pigment compositions and in particular the slope of the spectrophotometric curve in that critical region of the wave length band which lies between about 670 and 750 millimicrons.

An object of the present invention is to provide a superior green pigment which is economical to manufacture and which when used in a paint vehicle will form camouflage coating compositions having high hiding power.

Another object of the invention is to provide a superior green pigment having spectrophotometric characteristics substantially similar to chlorophyll.

A further object of the invention is to provide a superior camouflage coating composition having a dark green color akin to natural foliage and a sharp rise in percent reflectance value in the critical region of the wave length band between about 670 to 750 millimicrons.

These and other objects will become apparent from the following more complete description of the invention.

In its broadest aspects, the present invention relates to the formation of a green pigment comprising a chemical and/or physical combination of zinc oxide with the oxidic compounds of chromium, cobalt and titanium in such proportions that the spectrophotometric curve of the green pigment has a sharp rise in reflectance value between about 670 to 750 millimicrons corresponding substantially to that of chlorophyll; and which when mixed with a paint vehicle will provide a camouflage coating composition having high hiding power and good resistance to weathering.

With respect to the use hereinafter of the phrase "green pigment," it will be understood that the latter is used collectively to designate the plurality of green pigments which are included within the purview of the invention and which, as illustrated herein and hereinafter described, may be represented graphically by a family of spectrophotometric curves having the sharp rise in percent reflectance value within the critical wave length range of about 670 to 750 millimicrons which characterizes the spectrophotometric curve of chlorophyll.

In general, the camouflage coating compositions disclosed in the above-identified copending application of Foss et al. were formed from intimate mixtures of chromium sesquioxide, having the formula $Cr_2O_3$, and sometimes referred to hereinafter as chromium oxide; cobaltous oxide; and titanium dioxide, the oxides of chromium, cobalt and titanium being preferably in the form of chromium sesquioxide, cobalt carbonate and a neutralized hydrous titanium oxide, such as obtained by hydrolysis of titanium salt solutions, for example titanium sulfate solution, which were calcined at temperatures of about 900° C. to 1000° C. for a period of from ½ hour to 2 hours. The calcination of the mixture results in a chemical and/or physical combination of the constituents to form a green pigment which upon X-ray analysis appears to comprise mixed crystals of cobalt chromite, cobalt orthotitanate and titanium dioxide.

While the latter are probably the actual chemical compounds in the pigment, it has been found to serve the purpose of the description better to refer to these chemical compounds percentagewise in terms of the percent by weight of the chromium oxide, cobaltous oxide and titanium dioxide contained in the green pigment.

In general, the addition of an oxide of zinc to the cobaltous-chromium-titanium dioxide system has been found not only to increase the visible and infrared reflectance values of these green pigments but also to shift the green peaks of the spectrophotometric curves of these pigments towards longer wave lengths. Normally the reflectance value of a paint is lowered when applied to dark surfaces, such as for example black metal surfaces, dark woods, etc., and consequently a substantial increase in the reflectance value of the pigment material in an amount sufficient to offset this effect both in the visible range and in the infrared range is advantageous.

However, more important than these advantages, by far, is the fact that the addition of the oxides of zinc increases the slope of the spectrophotometric curve of pigment compositions of the cobaltous-chromium titanium dioxide system in the critical wave length region of from 670 to 750 millimicrons so that the spectrophotometric curves of these pigments correspond substantially exactly to the slope of the chlorophyll curve in the corresponding region of the wave length band.

More particularly, it has been found that the sharp increase in slope of the spectrophotometric curves of cobaltous-chromium-titanium dioxide systems within the above-identified critical wave length range occurs when an oxide of zinc is added in proper amounts to systems comprising substantially equimolar amounts of cobaltous oxide and chromium oxide with an excess of titanium dioxide; to systems containing an excess of chromium oxide and titanium dioxide over the cobaltous oxide; and to systems wherein the cobaltous oxide is in excess of the chromium oxide.

Further, it has been discovered that in all of these systems the amount of zinc oxide to be added bears a direct relationship to the molar amount of cobaltous oxide in the system.

Specifically, experimental work has shown that in cobaltous-chromium-titanium dioxide systems having equimolar amounts of cobaltous oxide and chromium oxide for each 5 mols of titanium dioxide, the effective amount of zinc oxide which may be tolerated is in the range of about 0.05 to about 3.0 times the molar amount of cobaltous oxide, and preferably about 1.0 for a system of $1Cr_2O_3 : 1CoO : 5TiO_2$; and that for systems involving an excess of chromium oxide over the cobaltous oxide, i. e. for systems wherein the ratio of $$\frac{Cr_2O_3}{CoO}$$

is greater than one, the effective amounts of zinc oxide are in the range of about 1.0 to about 2.0 and preferably about 2.0 times the molar amount of chromium oxide present in such systems; and that for systems wherein the ratio of $$\frac{Cr_2O_3}{CoO}$$

is less than 1, the effective amounts of zinc oxide are from about 0.75 to about 2.5 and preferably about 2.0 times the amount of cobaltous oxide.

The following table illustrates, on a mol basis, effective amounts of zinc oxide to be added to various cobaltous-chromium-titanium dioxide systems for achieving the sharp rise in reflectance value which characterizes that of chlorophyll in the above-identified critical wave length region.

TABLE I

| $Cr_2O_3$ | $CoO$ | $TiO_2$ | $ZnO$ |
|---|---|---|---|
| 0.5 | 0.5 | 5 | 0.05–0.50 |
| 1.0 | 1.0 | 5 | 0.1–1.0 |
| 3.0 | 3.0 | 5 | 1.5–3.0 |
| 2.0 | 1.0 | 5 | 1.0–2.0 |
| 1.0 | 2.0 | 5 | 0.75–2.0 |

The cobaltous oxide, chromium oxide, titanium dioxide and zinc oxide may be mixed together in any convenient manner. Although an intimate mixture of the oxidic compounds of chromium sesquioxide, cobalt carbonate, zinc oxide and hydrous titanium oxide is preferred from the standpoint of ease of handling, availability and cost considerations, it will be understood that other oxidic compounds of chromium and cobalt may be used. For example, the sulfates, acetates, and chlorides of chromium and cobalt may be used in combination with zinc oxide and the hydrate of titanium, and, in fact, any compounds of chromium, cobalt, zinc oxide and titanium may be used which, when heated during the calcination state, will give a molar composition comprising chromium oxide, cobaltous oxide, zinc oxide and titanium dioxide. Although zinc oxide is preferred from the standpoint of economy and convenience, it will be understood that other oxides of zinc may be used.

With respect to the source of titanium dioxide, a hydrous titanium oxide provides an aqueous medium which is ideal for forming a slurry of the oxidic compounds of titanium, chromium, zinc and cobalt. The hydrate may be treated with a neutralizing agent to prevent the formation of cobalt sulfate and facilitate the easy removal of ammonium sulfate during calcination.

After the mixture of materials has been thoroughly agitated, the slurry is then partially dried and transferred directly to a continuous rotary kiln in which the first portion of the kiln will act as a drier and the subsequent portion of the kiln as a calciner. The dried material is calcined at a temperature of from about 1000° C. to about 1100° C., the optimum calcining temperature being about 1050° C.

The calcination time has no appreciable effect upon the color of the pigment or its spectrophotometric curve other than to lower its reflectance value slightly but should generally be between ½ to 3 hours and preferably about 1 hour. Batches of dried material calcined under these preferred conditions are dark green in appearance, are soft and free from grit, and hence are ideally suited for incorporation into paint vehicles for the formation of camouflage coating compositions.

For visualizing the spectrophotometric characteristics of green pigments made by the process of this invention, reference may be made to Figure 1, the shaded area of which is characteristic of the spectrophotometric curves of any one of the improved green pigments within the scope of this invention. Included with these curves, for comparison, is the spectrophotometric curve H of chlorophyll and the spectrophotometric curve c of a pigment composition of the chromium-cobalt-titanium oxide system to which zinc oxide has not been added. By way of explanation, it will be seen that the graph covers the range of wave length from the lower end of the visible range (VR) corresponding to about 400 millimicrons through a portion of the near infrared range (IR) to a point corresponding to about 1000 millimicrons, the upper end of the visual range coinciding with the lower end of the near infrared range at about 700 millimicrons.

The chlorophyll curve H is characterized by a peak reflectance value, sometimes hereinafter referred to as the green peak (p) at about 550 millimicrons, a minimum reflectance value of about 5% at about 670 millimicrons and an extremely sharp rise in reflectance value of from 5 to 58% within the critical range of from 670 millimicrons to about 750 millimicrons.

The three curves a, b, and c in the shaded area of Figure 1 comprise pigment materials having the compositions listed below:

| | $Cr_2O_3$ | $CoO$ | $TiO_2$ | $ZnO$ | Time Hours |
|---|---|---|---|---|---|
| | Mols | Mols | Mols | Mols | Mols |
| (a) | 1.0 | 1.0 | 5 | 0.3 | 1.0 |
| (b) | 1.0 | 1.0 | 5 | 0.5 | 1.0 |
| (c) | 1.0 | 1.0 | 5 | | 1.0 |

As shown, the curves a and b, which are characteristic of the pigment compositions of this invention, start at the lower end of the visible range at percent reflectance values corresponding substantially to that of chlorophyll and rise at from about 525–530 millimicrons to green peaks with reflectance values ranging from about 21 to 22 percent which are above the percent reflectance value of chlorophyll at its green peak (p). From their green peaks the curves fall off rather sharply and are substantially parallel to but above the corresponding slope of the chlorophyll curve to a point opposite about 600 millimicrons from which point the curves slope downwardly at relatively flat angles to relatively low reflectance values of from about 10% to about 12% at about 670 millimicrons. From 670 to 750 millimicrons the curves rise sharply in percent reflectance values. Thus curve a, which is typical of the zinc oxide treated chromium-cobaltous-titanium dioxide system of curves, starts at a low reflectance value of about 10% and rises to a high reflectance value of about 53% which is an increase of about 43 reflectance value units in the critical wave length range of 670 to 750 millimicrons and compares favorably with an increase of about 46 units in reflectance value of the chlorophyll curve H in this same wave length range. The curve b follows closely the curvature of curve a and has an increase of about 42 units in percent reflectance value in the critical wave length range of from 670 to 750 millimicrons.

Other compositions having a sharp rise in percent reflectance value within the critical wave length range defined above are listed below wherein ($\Delta R$) represents the number of units increase in percent reflectance value within the range of 670 to 750 millimicrons.

| $Cr_2O_3$ | CoO | $TiO_2$ | ZnO | $\Delta R$ |
|---|---|---|---|---|
| Mols | Mols | Mols | Mols | Mols |
| 1 | 1 | 5 | 0.1 | 39 |
| 1 | 1 | 5 | 1.0 | 43 |
| 1 | 1 | 5 | 1.5 | 41 |
| 3 | 3 | 5 | 1.5 | 38 |
| 2 | 1 | 5 | 1.5 | 41 |
| 1 | 2 | 5 | 0.1 | ---- |

In comparison the spectrophotometric curve c of the chromium-cobaltous titanium oxide series pigment having a composition similar to that of a or b but containing no zinc oxide addition, has a low reflectance value of about 8% at about 670 millimicrons and a high reflectance value of about 37% at 750 millimicrons or an increase ($\Delta R$) in percent reflectance value of only about 32 units within the critical wave length range of 670 to 750 millimicrons.

The following examples are presented to illustrate more fully the process of the instant invention.

Example I

To 1600 parts of a 25% solids hydrous titanium oxide as the source of titanium dioxide were added 119 parts of cobalt carbonate as the source of cobaltous oxide, 152 parts of chromium sesquioxide and 81.4 parts of zinc oxide. The ingredients were then vigorously agitated to insure an intimate mixture whereupon the slurry was dried. The dried material was then calcined in a muffle furnace at 1050° C. for one hour. The calcined product was a soft dark green pigment which on analysis was found to comprise the following constituents on a mol basis:

5 mols titanium dioxide
1 mol chromium oxide
1 mol cobaltous oxide
1 mol zinc oxide To test the paint making properties of the pigment material, a camouflage paint was made using this green pigment material mixed with an alkyd vehicle at 2% PVC with 11% of a calcium carbonate extender. The paint was milled in a three roller paint mill and compared with a paint prepared in the same manner but using a standard chrome green pigment. It was noted that the hiding power of the camouflage paint of this invention was as good as and in some instances better than standard chrome green pigment and that its rise in reflectance value in the critical wave length range of from 670 to 750 millimicrons was substantially identical to that of chlorophyll.

Example II

To 1600 parts of a 25% solids hydrous titanium oxide as the source of titanium dioxide were added 119 parts cobalt carbonate as the source of cobaltous oxide, 304 parts of chromium sesquioxide and 40.7 parts zinc oxide. The ingredients were then vigorously agitated to insure an intimate mixture whereupon the slurry was dried and calcined in the manner described in the foregoing example. The calcined product was a soft dark green pigment which upon analysis was found to comprise the following constituents on a weight basis:

5 mols titanium dioxide
2 mols chromium oxide
1 mol cobaltous oxide
0.50 mol zinc oxide When made up into a camouflage paint, this pigment composition formed a paint having hiding power superior to that of chrome green paint and an excellent rise in reflectance value within the critical wave length range.

Example III

To 1600 parts of a 25% solids hydrous titanium oxide as the source of titanium dioxide were added 238 parts cobalt carbonate as the source of cobaltous oxide, 152 parts of chromium sesquioxide and 61 parts zinc oxide. The ingredients were then vigorously agitated to insure an intimate mixture whereupon the slurry was dried and calcined in the manner described in the foregoing example. The calcined product was a soft dark green pigment which upon analysis was found to comprise the following constituents on a weight basis:

5 mols $TiO_2$
1 mol chromium oxide
2 mols cobaltous oxide
0.75 mol zinc oxide

When made up into a camouflage paint, this pigment composition formed a paint having hiding power superior to that of chrome green paint and an excellent rise in reflectance value within the critical wave length range.

From the foregoing description of the invention, it will be evident that a green pigment composition comprising the cobaltous-chromium-titanium dioxide system admixed with zinc oxide has a spectrophotometric curve, the percent reflectance value of which is somewhat higher than that of chlorophyll and is characterized by a rapid increase in reflectance units within the critical wave length range between 670 and 750 millimicrons corresponding favorably with that of chlorophyll. Consequently, this pigment composition is ideally suited for use in the formation of camouflage coating compositions which cannot be detected visually nor by means of infrared ray photography; and which have high hiding power, low oil absorption and good resistance to weathering.

It will be understood that the examples shown are given merely for the purpose of illustration and that other variations and embodiments may be considered to fall within the scope of the invention as defined by the appended claim.

We claim:
A green pigment consisting of a solid state solution of chromium sesquioxide, cobalt oxide, zinc oxide and titanium dioxide, the amounts of said oxidic compounds being analytically present on a molar basis from:

1.0 to 3 mols chromium sesquioxide
1.0 to 3 mols cobaltous oxide
5 mols titanium dioxide
0.1 to 3.0 mols zinc oxide provided that when the ratio of chromium sesquioxide to cobaltous oxide is greater than one on a molar basis, the amount of zinc oxide will be from 50 to 100% the molar amount of chromium sesquioxide, and provided further that when the ratio of chromium sesquioxide to cobaltous oxide is less than one on a molar basis, then the amount of zinc oxide will be from 75 to 100% the molar amount of cobaltous oxide; and characterized by a spectrophotometric curve having an increase of about 40 percent reflectance value units in the wave length range of from 670 to 750 millimicrons.

References Cited in the file of this patent
UNITED STATES PATENTS

| 2,361,473 | Granville | Oct. 31, 1944 |
| 2,369,317 | Shurcliff | Feb. 13, 1945 |
| 2,579,020 | Smith | Dec. 18, 1951 |

OTHER REFERENCES

International Critical Tables, vol. 5, pp. 262 and 263.
"Photography by Infrared" (Clark); published by John Wiley and Sons, Inc., New York, N. Y., 2nd ed., pp. 355–369 (1946).
"Protective and Decorative Coatings" (Mattiello); published by J. Wiley and Sons, Inc., New York, N. Y., vol. 5, pp. 345–475 (1946).